3,521,370
SPRAY-DRYING PROCESS
Peter J. Senatore, Baldwin, N.Y., assignor to Chas. Pfizer & Co., Inc., New York, N.Y., a corporation of Delaware
No Drawing. Filed Oct. 23, 1968, Ser. No. 770,113
Int. Cl. F26b 3/00
U.S. Cl. 34—9      8 Claims

ABSTRACT OF THE DISCLOSURE

A method for preparing stabilized maltol and ethyl maltol by spray-drying from a solution of film-forming agent.

BACKGROUND OF THE INVENTION

This invention relates to a process for spray-drying solutions, and has particular reference to the prevention of the loss of volatile solids during the spray-drying process.

In the past it has been difficult to prepare relatively volatile solid substances such as maltol and ethyl maltol in the form of stable powders which can be stored for long periods of time without loss. Maltol and ethyl maltol are used as flavor enhancing substances in baked goods, chocolate, candies, and gelatin products. It is important that the added maltol or ethyl maltol be retained during the manufacture and subsequent storage of these products.

Spray-drying apparatus usually consists of a drying chamber through which is passed a current of heated drying air, or other gas, into which is atomized the solid-containing solution or slurry, so that intimate contact between the drying gas and the minute solid-containing particles is effected, with the result that the particles are dehydrated. Means for separating the resulting dry powder from the moisture-laden drying gas is provided, either in the drying chamber itself or apart therefrom.

A major handicap to the spray-drying of malot and ethyl maltol is the volatility of these substances. Ethyl maltol has a sealed tube melting point of 90° C., and it sublimes even at room temperature. Ethyl maltol has considerable vapor pressure under the spray-drying conditions of entrance temperatures of 200–220° C., and exit temperatures of 90–100° C. Losses of ethyl maltol, due to volatility during such spray-drying operation, amount to 40–50%.

One method of reducing the volatility of the dried or partly dried powder is to provide a stabilizing, protective coating to the material.

The process forming the subject matter of this invention involves a substantially different method of treating a solution of maltol or ethyl maltol than any heretofore used and effects a substantial saving in the cost of manufacturing these products.

SUMMARY OF THE INVENTION

In general, this invention embodies a process whereby maltol or ethyl maltol is spray-dried from an aqueous solution of a film-forming agent selected from the class of compounds comprising water-soluble gums, as represented by gum arabic, gum ghatti, gum guar; polyethylene glycols, exemplified by Carbowax (Carbide & Carbon), Armowax (Armour), Opal wax (Du Pont), Santowax (Monsanto); sugars, e.g. dextrose, sucrose, lactose; and polysaccharides, e.g. starch, dextrin, dextran.

DETAILED DESCRIPTION OF THE INVENTION

The terms "stable" and "unstable" used herein are employed to compare certain characteristics, particularly the degree of sensitiveness or weight loss due to heat. Unstabilized spray-dried ethyl maltol powder, subjected to storage for 50 hours at 50° C. suffers a weight loss of 50–60%. There is no weight loss due to sublimation when stabilized or coated particles of ethyl maltol, prepared in accordance with the process of the present invention, are subjected to the above described stability test.

Strictly speaking, "water-soluble" gums are not crystalloids but colloidal organic substances associated with plant life processes. Gum arabic and gum ghatti are tree exudations. The term gum arabic is generic for gums obtained from the Acacia tree. Similarly, gum ghatti is obtained from a genus of trees that includes the special Latifolia. Guar gum is a monogalactan obtained from the seeds of guar, a leguminous plant.

Synthetic waxes, as represented by the trade names of Carbowax, Armowax, Opal wax, and Santowax are water-soluble polyethylene glycols appropriate for use in the present invention.

Polysaccharides, like starch, dextrin, and dextran, are defined as complex carbohydrates which yield monosaccharides on hydrolysis.

Dextrose, sucrose, and lactose are familiar examples of mono and disaccharides that are useful film-forming agents. Fructose, xylose, mannose, sorbose, sorbitol, and galactose are other well-known acceptable sugar-coating substances.

A critical feature of this invention is that an aqueous solution, in contrast to a slurry, of the maltol or ethyl maltol and the film-forming agent is introduced to the drying process. It has been surprisingly found that if the maltol or ethyl maltol is dissolved prior to spray-drying, the particles which result are completely coated with an outer layer of the film-forming agent, whereas a composite particle without such intact coating might have been expected. This unique result with its attendant advantages is not achieved if the maltol or ethyl maltol is dried from a slurry in a solution of the film-former. Complete solution of the maltol or ethyl maltol and the film-forming agent may be effected by warming where necessary prior to introduction to the drier.

Weight ratios of film-forming agent to maltol or ethyl maltol of from 4:1 to 11:1 give particularly good results, with about 9:1 a preferred ratio. The total solids concentration in aqueous solution is not critical, but a range of about 30–35% by weight will usually prove most convenient. Other variations in ratio and concentration of ingredients are acceptable within the limits of aqueous solubilities.

Introduction of the aqueous solution of maltol or ethyl maltol and film-forming agent to a spray chamber and a circulating current of heated gas flowing countercurrent to the direction of the spray gives 80–100% recovery of coated particles. The percentage of maltol or ethyl maltol in the coated particles is a function of the percentage of these ingredients in the initial feed.

As a still further specific embodiment of the principles of this invention, the stabilized particles of maltol and ethyl maltol retain their complete flavor enhancing properties and concentration after addition to the manufacturing process of baked goods, chocolate, candies, and gelatin products, and the subsequent storage of these products.

The following examples are merely illustrative and are not intended to limit the invention, the scope of which is defined by the appended claims.

Example 1

8.5 grams of ethyl maltol and 91.5 grams of gum acacia are dissolved by heating in 200 ml. of water. The solution is fed into a spray-dryer fitted with a turbine atomizer at an inlet air temperature of 280° C. and exit air temperature of 92° C. The overall recovery of total spray-dried solids is 86.6% with an ethyl maltol assay of 7.4%.

There is no weight loss when the dried powder is held for 50 hours at 50° C.

Example 2

The process of Example 1 is repeated with maltol in place of ethyl maltol, with comparable results.

Example 3

10 grams of ethyl maltol and 90 grams of dextrose are dissolved by heating in 200 ml. of water. The solution is fed into a spray-dryer at an inlet air temperature of 205° C. to obtain stable, dry solid product in excellent yield.

Example 4

The process of Example 3 is repeated with maltol in place of ethyl maltol, with comparable results.

Example 5

20 grams of ethyl maltol and 80 grams of polyethylene glycol, (Carbowax 6000, available from Carbide and Carbon) are dissolved in 200 ml. of water. The solution is fed into a spray-dryer at an air inlet temperature of 210° C. to obtain in good yield a dry product consisting of coated particles which exhibit negligible weight loss after 50 hours at 50° C.

Example 6

10 grams of ethyl maltol and 90 grams of dextrans are dissolved at 75° C. in 200 ml. of water. The solution is spray-dried at an air inlet temperature of 212° C. to obtain good recovery of stable dextran-coated particles.

Example 7

The process of Example 6 is repeated using maltol instead of ethyl maltol, with comparable results.

Example 8

20 lbs. of ethyl maltol and 80 lbs. of gum acacia, placed in a stainless steel kettle, are dissolved with heating in 90.8 liters of water. The temperature of the solution in the kettle is maintained at 198–208° F. Two heat exchangers are inserted in the feed lines between the kettle and spray nozzle, and maintained at 220° F. The feed rate into the spray-dryer is adjusted at the rate of 450 lbs. solution per hour. The recovery of total spray-dried solids is 98.6% with the coated particles assaying 19.7% ethyl maltol. These coated particles do not lose weight when stored for 50 hours at 50° C.

Example 9

The process described in Example 8 is repeated using maltol in place of ethyl maltol, with comparable results.

What is claimed is:

1. A method for stabilizing maltol and ethyl maltol which comprises completely dissolving at least one of these substances in an aqueous solution of film-forming agent selected from the class consisting of water-soluble gums, polyethylene glycols, sugars, and polysaccharides, and thereafter spray-drying said solution.

2. The method of claim 1 wherein said film-forming agent is gum acacia.

3. The method of claim 1 wherein said film-forming agent is polyethylene glycol.

4. The method of claim 1 wherein said film-forming agent is dextrose.

5. The method of claim 1 wherein said film-forming agent is dextran.

6. The method of claim 1 wherein the weight ratio of film-forming agent to maltol or ethyl maltol is from about 4:1 to 11:1.

7. The method of claim 1 wherein the weight ratio of film-forming agent to maltol or ethyl maltol is about 9:1.

8. The method of claim 1 wherein the total solids concentration in said solution is from about 30 to 35% by weight.

References Cited

UNITED STATES PATENTS 3,414,980   12/1968   Nezbed _____ 34—9

JOHN T. CAMBY, Primary Examiner

U.S. Cl. X.R.

34—10